(12) United States Patent
Park et al.

(10) Patent No.: US 7,715,317 B2
(45) Date of Patent: May 11, 2010

(54) FLOW GENERATION METHOD FOR INTERNET TRAFFIC MEASUREMENT

(75) Inventors: Jeong Sook Park, Daejeon (KR); Seung Hyun Yoon, Daejeon (KR); Hyung Hwan Kim, Daejeon (KR); Chang Hoon Kim, Seoul (KR); Hyung Seok Chung, Daejeon (KR); Byung Joon Lee, Daejeon (KR); Taesang Choi, Daejeon (KR); Tae Soo Chung, Daejeon (KR)

(73) Assignee: Electronics and Telecommunications Research Institute (KR)

( * ) Notice: Subject to any disclaimer, the term of this patent is extended or adjusted under 35 U.S.C. 154(b) by 1223 days.

(21) Appl. No.: 10/933,930

(22) Filed: Sep. 2, 2004

(65) Prior Publication Data

US 2005/0117513 A1    Jun. 2, 2005

(30) Foreign Application Priority Data

Nov. 28, 2003    (KR)    ............. 10-2003-0085806

(51) Int. Cl.
*H04L 12/26*    (2006.01)
(52) U.S. Cl. .................... 370/235; 370/231
(58) Field of Classification Search ....... 370/229–236.2
See application file for complete search history.

(56) References Cited

U.S. PATENT DOCUMENTS

| 6,243,667 | B1 |   | 6/2001 | Kerr et al. |   |
|---|---|---|---|---|---|
| 6,405,251 | B1 |   | 6/2002 | Bullard et al. |   |
| 7,366,790 | B1 | * | 4/2008 | Rustad et al. | 709/235 |
| 7,433,947 | B1 | * | 10/2008 | Iyer et al. | 709/224 |
| 2002/0138618 | A1 | * | 9/2002 | Szabo | 709/225 |
| 2007/0195787 | A1 | * | 8/2007 | Alnuweiri et al. | 370/395.4 |
| 2008/0101233 | A1 | * | 5/2008 | Shi et al. | 370/235 |

FOREIGN PATENT DOCUMENTS

KR    1020030028013    4/2003

* cited by examiner

*Primary Examiner*—Thai D Hoang
(74) *Attorney, Agent, or Firm*—Blakely Sokoloff Taylor & Zafman

(57) ABSTRACT

Provided is a flow generation method for Internet traffic measurement. In the flow generation method, dependency between packet collecting time and flow generating time is removed using a virtual timer and a flow generation completion processing interval is controlled to skip by a unit time in response to a user's request. Also, a fragmented packet processing method is selectively used at need and a FIN timeout is applied selectively to a timeout mechanism used in flow generation completion. Thereby, this invention can improve accuracy and efficiency of Internet traffic measurement.

16 Claims, 4 Drawing Sheets

FLOW GENERATION METHOD FOR INTERNET TRAFFIC MEASUREMENT

This application claims the priority of Korean Patent Application No. 2003-85806, filed on Nov. 28, 2003, in the Korean Intellectual Property Office, the disclosure of which is incorporated herein in its entirety by reference.

BACKGROUND OF THE INVENTION

1. Field of the Invention

The present invention relates to an Internet traffic measurement method, and more particularly, to a flow generation method for accurate and efficient measurement of traffic flowing in the Internet.

2. Description of the Related Art

Traffic measurement performed in the Internet has been mainly used to measure the scale of traffic for each line or device or to provide simple analysis results by monitoring utilization of each line using a management information base (MIB) or monitoring a level at which a monitoring method is slightly complemented. However, such simple measurement results are insufficient to understand the performance of the Internet.

Traffic measurement becomes the critical factor in researches on the Internet due to the sharp increase in the Internet users, the increase in scale of and the complication of Internet, and the increase in scale of and the variety of application of Internet traffic. Traffic measurement in the Internet directly involves designing and planning at an initial step of a network, traffic engineering at a step of operation of the network, provision of future high-quality Internet services, billing, and service level agreement (SLA). Also, traffic measurement is a task that should be basically performed in every network related work. Thus, there exists a need for researches on traffic measurement methods based on the characteristic of traffic measurement.

One of the traffic measurement methods that are actively studied is a flow-based Internet traffic measurement method. This method involves reducing the amount of measurement and more clearly recognizing the characteristic of Internet traffic by processing collected packets into flows (i.e., a group of packets having a common feature), thereby making it possible to provide the above-mentioned services.

In currently used flow-based Internet traffic measurement methods, there are a method as used in the Internet equipment company CISCO systems, Inc., in which a NetFlow function is implemented in a router, traffic passing through the router is processed into flows, and the flows are transmitted to an analyzing server. And there are various probes which is similar to the above method.

However, in these methods, processing of packets into flows having a common feature means that comparison and searching need to be performed on a packet-by-packet basis and, in some cases, not only headers of packets but also payloads of packets should be searched for in a real-time manner. Such operations mean a lot of processing time is needed in comparison to a speed of packet collection and independence between a speed of packet collection and a speed of packet processing should be guaranteed. However, there has been no proposal for measurement methods considering these characteristics.

SUMMARY OF THE INVENTION

The present invention provides a method, in which time used in processing packets and generating flows is made to totally depend on packet collecting time by introducing the concept of a virtual timer and packets are accurately processed regardless of the amount of time required for packet processing by guaranteeing independency between packet collecting time and packet processing time.

The present invention also provides a flow generation method for Internet traffic measurement, in which information loss caused by fragmentation is minimized by defining a fragmented packet processing method and selectively using the defined fragmented packet processing method at need.

The present invention also provides a method of defining and introducing several timeout mechanisms so as to adopt different flow generation completion methods according to the characteristic of flows.

The present invention also provides a computer readable recording medium having recorded thereon a program for the methods.

According to an aspect of the present invention, there is provided a flow generation method for Internet traffic measurement, the flow generation method comprising: (a) determining whether there is a flow that is the same as a packet, if a receiving time of the packet is smaller than a value of a virtual timer; (b) updating a statistical value of the flow and duration of the flow, if there is the flow that is the same as the packet; (c) generating a new flow, if there is no flow that is the same as the packet; and (d) applying a predetermined timeout mechanism to all currently generated flows, completing generation of the flow, and updating the value of the virtual timer, if the receiving time of the packet is greater than the value of the virtual timer.

According to another aspect of the present invention, there is provided a method of processing a fragmented packet, the method comprising: (a) storing header information in a storage device, if an input packet is the first packet; (b) adding header information of a next packet including fragmented information to the input packet, if the input packet is not the first packet; and (c) searching for a packet including the fragmented information within a predetermined fragmentation timeout range and adding header information of the found packet to the current packet, if the packet does not include the fragmented information.

According to another aspect of the present invention, there is provided a method of completing flow generation for Internet traffic measurement, the method comprising: (a) completing generation of the flow by applying a predetermined FIN timeout, if there is a distinct termination packet; (b) completing generation of the flow by applying a predetermined inactive timeout, if there is no distinct termination packet; and (c) compulsorily completing generation of the flow by applying a predetermined active timeout, if there is no distinct termination packet and the flow lasts a very long time.

BRIEF DESCRIPTION OF THE DRAWINGS

The above and other features and advantages of the present invention will become more apparent by describing in detail an exemplary embodiment thereof with reference to the attached drawings in which.

DETAILED DESCRIPTION OF THE INVENTION

Figure 1:
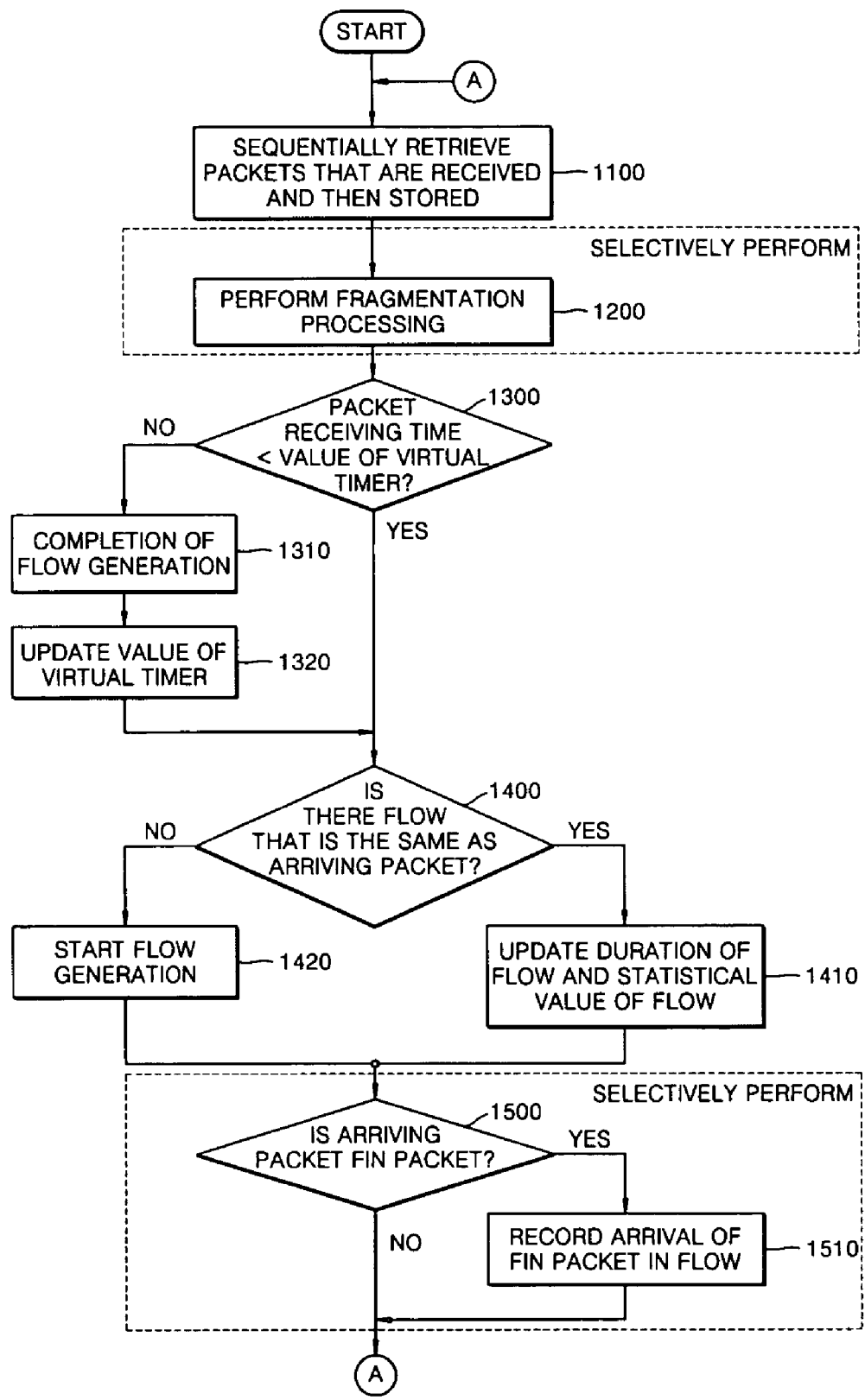
FIG. 1 is a flowchart illustrating a traffic generation method according to the present invention.

FIG. 1 is a flowchart illustrating a traffic generation method according to the present invention, in which the entire flow generation procedure is schematically illustrated.

Referring to FIG. 1, a flow generation method according to the present invention comprises operation 1100 of sequentially retrieving packets, which are received from a circuit through a packet receiver and sequentially stored in a storage area of a system, one by one and operation 1200 of performing fragmentation processing on fragmented packets at need. Here, operation 1200 is selectively performed and, if fragmentation processing is not performed, operation 1200 is not performed and a process skips operation 1200 and directly goes to operation 1300. In operation 1300, a value of a virtual timer is compared with packet receiving time. In operation 1400, it is determined whether there is a packet that is the same as an arriving packet.

As a result of comparison in operation 1300, if the packet receiving time is greater than the value of the virtual timer, flow generation is completed in operation 1310 by applying a predetermined timeout mechanism to a list of currently generated flows and the value of the virtual timer is updated to a value that is greater than the packet receiving time in operation 1320. Then it is determined whether there is a flow that is the same as the arriving packet, in operation 1400.

As a result of determination in operation 1400, if there is a flow that is the same as the arriving packet, duration and statistical values (e.g., terminating time, the number of packets of the flow, and the number of bytes) of the flow are updated in operation 1410. As a result of determination in operation 1400, if there is no flow that is the same as the arriving packet, a flow having 5-tuple (a source IP address, a destination IP address, a source port number, a destination port number, and a protocol ID) as key values is generated and the number of packets, the number of bytes, flow starting time, and flow terminating time are recorded, in operation 1420.

When a FIN timeout is adopted, it is determined whether the arriving packet is a FIN packet (i.e., a final packet) in operation 1500. As a result of determination in operation 1500, if the arriving packet is not the FIN packet, the process goes back to operation 1100. If the arriving packet is the FIN packet, arrival of the FIN packet is recorded in a flow and the process goes back to operation 1100 in operation 1510. This procedure is repeated as long as there exists a packet in a data storage area of the system regardless of a packet receiving speed of a packet collector. Here, the FIN packet means a packet where a FIN flag is set and the FIN packet is used for indicating the final packet of the flow. Operations 1500 and 1510 are selectively performed and, if the FIN timeout is not adopted, operations 1500 and 1510 are skipped and the process goes back to operation 1100.

The flow generation method according to the present invention has several characteristics as follows. First, packet collecting speed and packet processing speed are separated (see FIG. 2). Second, three kinds of timeout mechanisms for flow generation completion are used (see FIG. 3). Third, loss of flow information is minimized through packet fragmentation processing (see FIG. 4).

To this end, in the present invention, six timer related variables, i.e., a virtual timer, a unit time, an inactive timeout, an active timeout, a FIN timeout, and a fragmentation timeout, are defined and used. Details about these variables are as follows.

The virtual timer is used to determine flow generation completion. The virtual timer is a discrete timer that operates to skip by unit time according to the packet receiving time. In the present invention, by using such a discrete timer as the virtual timer, it makes possible to separate the packet collecting speed and the packet processing speed and to measure traffic more accurately. In practice, each packet is not uploaded to a generation module whenever each packet is collected, but a plurality of packets is buffered and then uploaded at a time. As a result, since there may be a large gap between packet collecting time and packet processing time, it is the most accurate method to entirely depend on the packet collecting time for an operation of the virtual timer.

The unit time is used to determine a change interval of the virtual timer. As pointed out above, the virtual timer operates according to the packet collecting time. If a system is established only using the concept of the virtual timer, it should be checked if flow generation is completed for every packet. Such an operation imposes a heavy burden on processing resources. Thus, in the present invention, to make it possible to adjust a checking interval in response to a user's request, the change interval is determined using the unit time. In this case, as the unit time decreases, searching should be performed more frequently and a heavy burden is imposed on processing resources. On the other hand, as the unit time increases, searching is performed less frequently, but there may be no room in the storage area. Therefore, the unit time is set based on such correlation.

Flow generation completion is determined based on three mechanisms, i.e., the inactive timeout, the active timeout, and the FIN timeout. An algorithm concerning generation completion will be described in detail with reference to FIG. 3. Thus, the concept of the algorithm will be only mentioned here. A flow can be roughly classified into three types: the first case where a flow is completed by a distinct termination packet (e.g., the FIN packet), the second case where there is no distinct termination packet, and the third case where a flow lasts a long period without a distinct termination packet and needs to be compulsorily completed.

The inactive timeout is used for flow completion when there is no distinct termination packet. For example, if any packet does not arrive until the inactive timeout after the final packet arrives, the flow is considered to be completed and flow generation is completed. This operation is performed by comparing a difference between the value of the virtual timer and the flow terminating time with the inactive timeout.

The active timeout is used to compulsorily complete flow generation when there is a flow that lives longer than the active timeout. This operation is performed by comparing a difference between the value of the virtual timer and the flow starting time with the active timeout.

The FIN timeout is used when flow termination is distinctly determined by the termination packet like the FIN packet. Because of a connectionless feature if the internet, a packet that should arrive prior to the termination packet may arrive behind the termination packet. If a flow is terminated immediately after the termination packet is received, flow information may be lost due to a packet having a reversed order within the same flow. To prevent loss of flow information, the FIN timeout is used to wait for another packets for a given time.

The fragmentation timeout is used to minimize loss of flow information caused by packet fragmentation. Details about the fragmentation timeout will be described in detail with reference to FIG. 4.

Figure 2:
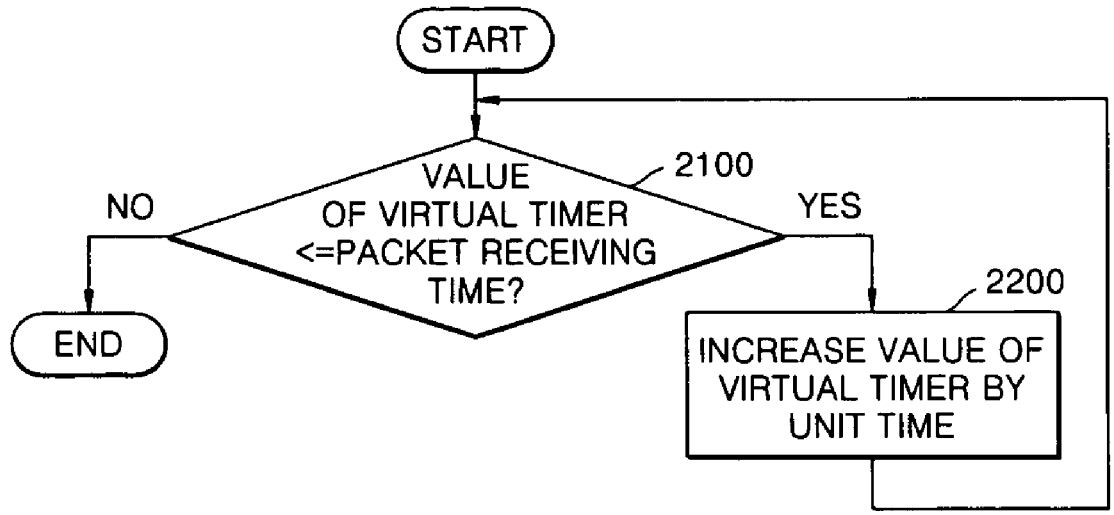
FIG. 2 is a flowchart illustrating a virtual timer operating method according to the present invention.

FIG. 2 is a flowchart illustrating a virtual timer operating method according to the present invention.

According to the virtual timer operating method, it is determined whether the value of the virtual timer is smaller than the packet receiving time, in operation 2100. As a result of determination in operation 2100, if the value of the virtual timer is smaller than or equal to the packet receiving time, the value of the virtual time is increased by the unit time until the value of the virtual time is greater than the packet receiving time, in operation 2200. In this way, it is possible to obtain a future reference time point at which flow generation completion is to be performed.

In this case, if packets arrive at high or normal speeds, the value of the virtual timer is continuously updated and any problem is not caused. However, if packets arrive at very large intervals, the value of the virtual timer cannot be updated and flow generation completion cannot be performed. To solve such a problem, if packets arrive at very large intervals, the value of the virtual timer is updated using present time informed by the packet collector at predetermined intervals.

Figure 3:
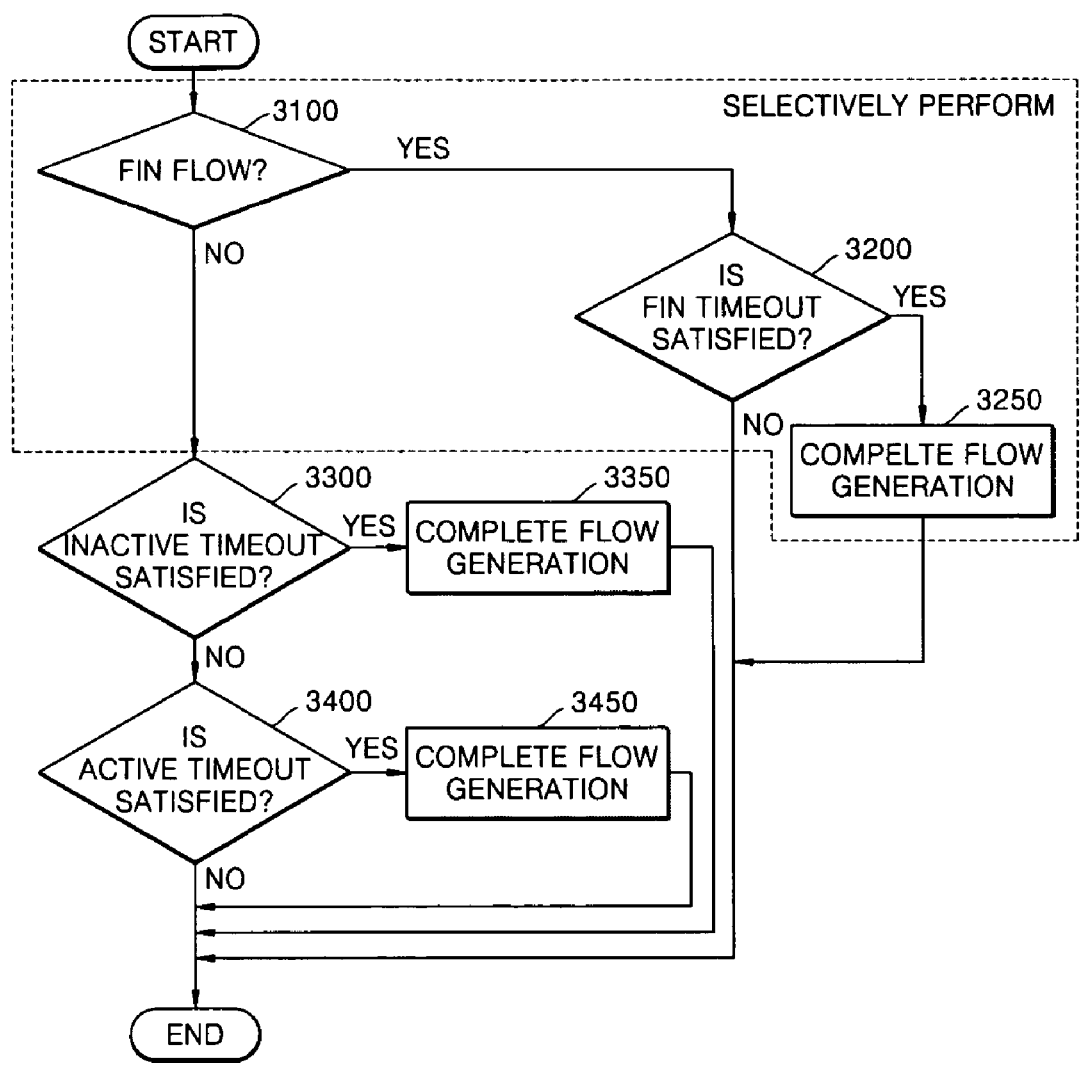
FIG. 3 is a flowchart illustrating a flow generation completion processing method according to the present invention.

FIG. 3 is a flowchart illustrating a flow generation completion processing method according to the present invention. Referring to FIG. 3, for flow generation completion, it is determined whether a flow to be tested is the FIN flow, in operation 3100. As a result of determination in operation 3100, if the flow to be tested is the FIN flow, it is determined whether a difference between receiving time of the final packet and the value of the virtual timer is greater than the FIN timeout by applying the FIN timeout (i.e., the FIN timeout is satisfied), in operation 3200. As a result of determination in operation 3200, if the FIN timeout is satisfied, flow generation is completed and the process is terminated, in operation 3250. If the FIN timeout is not satisfied, the process is terminated. At this time, due to abnormality in a network such as viruses, there may be a flow that lasts a very long time among flows having the FIN packets arrived. Thus, in the case of the flows having the FIN packets, the ending-time of the flow is calculated as the arriving time of the FIN packets. Operations 3100 through 3250 correspond to a case where the FIN timeout is applied to a timeout mechanism used in flow generation completion processing and are selectively performed at need. When the FIN timeout is not applied, flow generation completion is only processed by the inactive timeout and the active timeout.

As a result of determination in operation 3100, if the flow to be tested is not the FIN flow, it is determined whether the difference between the receiving time of the final packet and the value of the virtual timer exceeds the inactive timeout (i.e., the inactive timeout is satisfied), in operation 3300. As a result of determination in operation 3300, if the inactive timeout is satisfied, flow generation is completed and the process is terminated, in operation 3350.

As a result of determination in operation 3300, if the difference between the receiving time of the final packet and the value of the virtual timer does not exceed the inactive timeout (i.e., the inactive timeout is not satisfied), it is determined whether a difference between the flow starting time and the value of the virtual timer is greater than the active timeout (i.e., the active timeout is satisfied), in operation 3400. As a result of determination in operation 3400, if the active timeout is not satisfied, the process is terminated.

In FIG. 3, an order of testing for flow generation completion is the FIN timeout, then the inactive timeout, and then the active timeout. FIG. 3 corresponds to an algorithm where the FIN timeout is applied for more efficient flow generation. If the FIN timeout is not applied, flow generation completion is only processed by the inactive timeout and the active timeout. In this case, an order of processing is the inactive timeout, then the active timeout.

Figure 4:
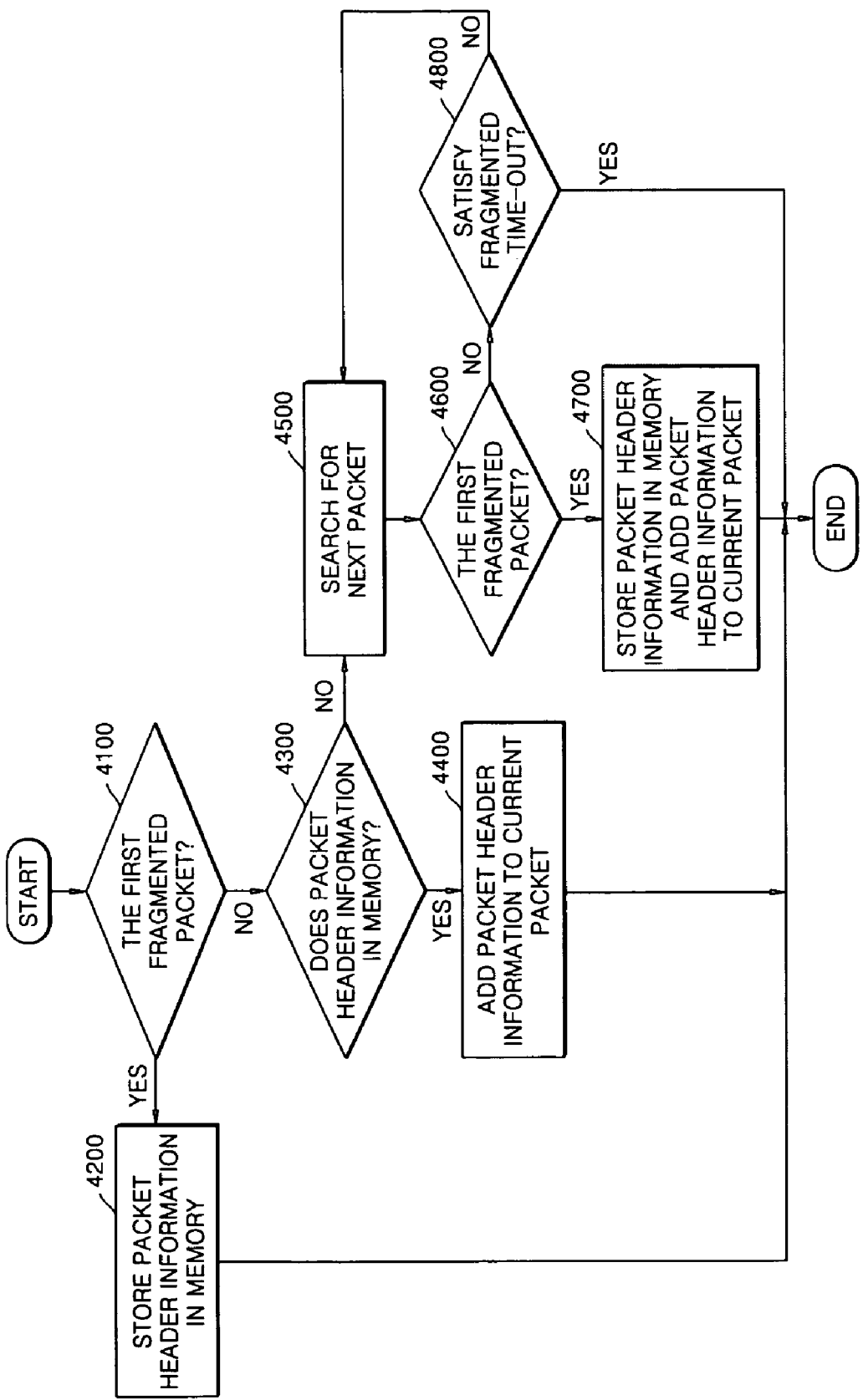
FIG. 4 is a flowchart illustrating a fragmented packet processing method according to the present invention.

FIG. 4 is a flowchart illustrating a fragmented packet processing method according to an embodiment of the present invention. As the Internet traffic exponentially increases, the increase in the relative importance of fragmented packets among traffic over the Intent network is not negligible. Thus, for more accurate traffic measurement, fragmented packets have to be considered.

Referring to FIG. 4, in the fragmented packet processing method, initially it is determined whether a received packet is a first packet in operation 4100. As a result of the determination in operation 4100, it the received packet is the first packet, header information of the received packet is stored in a storage device in operation 4200 and the process is terminated.

However, if it is determined in operation 4100 that the received packet is not the first packet, it is determined whether the packet header information exists in the storage device in operation 4300. If it is determined in operation 4300 that the packet header information exists, the packet header information is added to the current packet in operation 4300 and the process is terminated.

If it is determined in operation 4300 that no packet header information exist in the storage device, a next packet is received (operation 4500), and it is determined whether the received packet is a first fragmented packet (operation 4600). If it is determined in operation 4600 that the received packet is the first packet, the packet header information is stored in a storage device such as a memory and at the same time added to the current packet (operation 4700), and the process is terminated.

If it is determined in operation 4600 that the received packet is not the first packet, a temporal difference between the time at which the current packet is received and the time at which the next packet is received is compared, and it is determined whether the temporal difference satisfies a fragmentation timeout (operation 4800). Here, the fragmentation timeout refers to the maximum limit of fragmentation processing time of packets undergoing fragmentation.

If it is determined in operation 4800 that the fragmentation timeout is satisfied, i.e., if the temporal difference is greater than or equal to the fragmentation timeout, the fragmentation processing is aborted and the process is terminated. However, if it is determined in operation 4800 that the fragmentation timeout is not satisfied, the process goes back to operation 4500 to receive a next packet and repeat the processed described above. This process is terminated only when the fragmentation timeout is satisfied or when the first fragmented packet is found.

As described above, according to the Internet traffic measurement method of the present invention, by making flow generation depend on the packet collecting time using the virtual timer, dependency between the packet collecting time and the flow generation time is removed, thereby more accurately measuring traffic. Also, by introducing the concept of discrete time that makes a flow generation completion processing interval skip by the unit time in response to a user's request, it is possible to achieve more accurate traffic measurement using a efficiency improving method. By newly defining the fragmented packet processing method and selectively using the defined fragmented packet processing method, it is possible to minimize loss of information caused by fragmentation during Internet traffic measurement. Also, by applying the FIN timeout to the timeout mechanism used in flow generation completion, it is possible to improve efficiency of Internet traffic measurement.

Therefore, according to the Internet traffic measurement method of the present invention, independency between the packet collecting time and the packet processing time can be guaranteed, loss of information caused by fragmentation can be minimized, and accuracy and efficiency of Internet traffic measurement can be improved.

The present invention can be implemented as computer readable codes in computer readable recording media. The computer readable recording media include all kinds of recording apparatuses in which data that can be read by a computer system is stored. Such computer readable recording media are ROM, RAM, CD-ROM, magnetic tape, floppy disk, and optical data storage. The computer readable recording media can be distributed in a computer system connected to a network, and can be stored and operated in forms of computer readable codes.

While the present invention has been particularly shown and described with reference to an exemplary embodiment thereof, it will be understood by those of ordinary skill in the art that various changes in form and details may be made therein without departing from the spirit and scope of the present invention as defined by the following claims.

What is claimed is:

1. A flow generation method for Internet traffic measurement, the flow generation method comprising:
    (a) determining whether a packet received from a circuit through a packet receiver is part of at least one existing flow, if a receiving time of the packet is smaller than a value of a virtual timer;
    (b) updating a statistical value of the flow and duration of the flow, if the packet is determined to be part of the at least one existing flow;
    (c) generating a new flow, if the packet is determined to not be part of the at least one existing flow; and
    (d) applying a predetermined timeout mechanism to all currently existing flows, completing generation of the existing flows, and updating the value of a virtual timer, if the receiving time of the packet is greater than or equal to the value of the virtual timer.

2. The flow generation method of claim 1, further comprising, prior to operation (a), sequentially retrieving packets collected from the circuit and performing fragmentation processing on the retrieved packets.

3. The flow generation method of claim 2, wherein the performing of fragmentation processing further comprises:
    (e-1) storing header information in a storage device, if the packet is the first packet;
    (e-2) adding header information of a next packet including fragmented information to a current packet, if the packet is not the first packet; and
    (e-3) searching for a packet including the fragmented information within a predetermined fragmentation timeout range and adding header information of the found packet to the current packet, if the packet does not include the fragmented information.

4. The flow generation method of claim 3, wherein the fragmentation timeout indicates the maximum limit of a fragmentation processing time of packets undergoing fragmentation.

5. The flow generation method of claim 1, further comprising recording arrival of a final packet in the flow, if the packet is the final packet.

6. The flow generation method of claim 1, wherein the virtual timer is a discrete timer that operates to skip by a unit time according to the receiving time of the packet instead of current processed time.

7. The flow generation method of claim 1, wherein the value of the virtual timer is updated by repetition of increases by the unit time until the value of the virtual timer is greater than the receiving time of the packet if the value of the virtual timer is smaller than or equal to the receiving time of the packet.

8. The flow generation method of claim 1, wherein operation (d) further comprises:
    (d-1) completing generation of the at least one existing flow by applying a predetermined FIN timeout, if there is a distinct termination packet;
    (d-2) completing generation of the at least one existing flow by applying a predetermined inactive timeout, if there is no distinct termination packet; and
    (d-3) compulsorily completing generation of the at least one existing flow by applying a predetermined active timeout, if there is no distinct termination packet and the flow lasts longer than a predetermined period of time.

9. The flow generation method of claim 8, wherein in operation (d-1), if a difference between the receiving time of the final packet and the value of the virtual timer exceeds the FIN timeout, generation of the at least one existing flow is completed.

10. The flow generation method of claim 8, wherein in operation (d-2), if the difference between the receiving time of the final packet and the value of the virtual timer exceeds the inactive timeout, generation of the at least one existing flow is completed.

11. The flow generation method of claim 8, wherein in operation (d-3), if the difference between the receiving time of the first packet and the value of the virtual timer exceeds the active timeout, generation of the at least one existing flow is completed.

12. A computer readable recording medium having recorded thereon a program which when executed by a computer performs a flow generation method comprising:
    (a) determining whether a packet received from a circuit through a packet receiver is part of at least one existing flow, if a receiving time of the packet is smaller than a value of a virtual timer;
    (b) updating a statistical value of the flow and duration of the flow, if the packet is determined to be part of the at least one existing flow;
    (c) generating a new flow, if the packet is determined to not be part of the at least one existing flow; and
    (d) applying a predetermined timeout mechanism to all currently existing flows, completing generation of the existing flows, and updating the value of the virtual timer, if the receiving time of the packet is greater than or equal to the value of the virtual timer.

13. A computer readable recording medium having recorded thereon a program which when executed by a computer performs a flow generation method comprising:
    (a) completing generation of the flow by applying a predetermined FIN timeout, if there is a distinct termination packet;
    (b) completing generation of the flow by applying a predetermined inactive timeout, if there is no distinct termination packet; and
    (c) compulsorily completing generation of the flow by applying a predetermined active timeout, if there is no distinct termination packet and the flow lasts longer than a predetermined time.

14. The method of claim 13, wherein in operation (a), if a difference between the receiving time of the final packet and the value of the virtual timer exceeds the FIN timeout, generation of the flow is completed.

15. The method of claim 13, wherein in operation (b), if the difference between the receiving time of the final packet and the value of the virtual timer exceeds the inactive timeout, generation of the flow is completed.

16. The method of claim 13, wherein in operation (c), if the difference between the receiving time of the final packet and the value of the virtual timer exceeds the active timeout, generation of the flow is completed.

\* \* \* \* \*